United States Patent
Rickling

(10) Patent No.: US 9,400,033 B2
(45) Date of Patent: Jul. 26, 2016

(54) METHOD FOR PRODUCING A LINK-PLATE CHAIN

(71) Applicant: Nicolas Rickling, Offendorf (FR)

(72) Inventor: Nicolas Rickling, Offendorf (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/384,651

(22) PCT Filed: Feb. 27, 2013

(86) PCT No.: PCT/EP2013/053863
§ 371 (c)(1),
(2) Date: Sep. 11, 2014

(87) PCT Pub. No.: WO2013/135483
PCT Pub. Date: Sep. 19, 2013

(65) Prior Publication Data
US 2015/0057118 A1 Feb. 26, 2015

(30) Foreign Application Priority Data
Mar. 12, 2012 (DE) .......................... 10 2012 203 780

(51) Int. Cl.
*F16G 5/18* (2006.01)
*B21L 15/00* (2006.01)
*B21L 9/06* (2006.01)

(52) U.S. Cl.
CPC . *F16G 5/18* (2013.01); *B21L 9/065* (2013.01); *B21L 15/00* (2013.01); *B21L 15/005* (2013.01)

(58) Field of Classification Search
CPC ....... B21L 15/00; B21L 15/005; B21L 9/065; F16G 5/18
USPC ............................................ 59/35.1; 474/215
See application file for complete search history.

(56) References Cited

U.S. PATENT DOCUMENTS

| 4,911,682 A * | 3/1990 | Ivey .......................... F16G 5/18 474/215 |
| 6,558,281 B1 | 5/2003 | Greiter |
| 6,824,484 B2 * | 11/2004 | Greiter .................. B21L 15/005 474/201 |
| 7,320,656 B2 | 1/2008 | Linnenbrügger et al. |
| 7,357,742 B2 | 4/2008 | Wagner et al. |
| 7,937,925 B2 * | 5/2011 | Linnenbrugger ....... B21L 15/00 474/215 |
| 2005/0202915 A1 | 9/2005 | Pichura et al. |
| 2006/0254248 A1 * | 11/2006 | van Rooij ............... B21L 15/00 59/6 |
| 2008/0196381 A1 | 8/2008 | Tada et al. |
| 2009/0126334 A1 * | 5/2009 | Van Rooij ............. B21L 15/005 59/1 |

FOREIGN PATENT DOCUMENTS

| DE | 100 47 979 A1 | 4/2001 |
| DE | 100 52 473 A1 | 5/2001 |
| DE | 103 29 708 A1 | 1/2004 |
| DE | 10 2004 012 400 A1 | 9/2004 |
| EP | 1 949 986 A1 | 7/2008 |
| JP | 2009-103152 A | 5/2009 |
| JP | 2009 103152 A | 5/2009 |

* cited by examiner

*Primary Examiner* — David B Jones
(74) *Attorney, Agent, or Firm* — Alfred J. Mangels

(57) ABSTRACT

A method for providing a link-plate chain having increased strength by stretching the chain between a pair of spaced, rotatable conical pulleys, wherein the link-plate chain is stretched in opposite directions of rotation of the conical pulleys. The opposite stretching operations impart deformation forces on at least the link-plates and/or rocker pressure pieces that interconnect link plates of the link-plate chain. The deformation forces cause parts of the chain to undergo plasticization regions of the chain components and that result in increased chain strength.

7 Claims, 1 Drawing Sheet

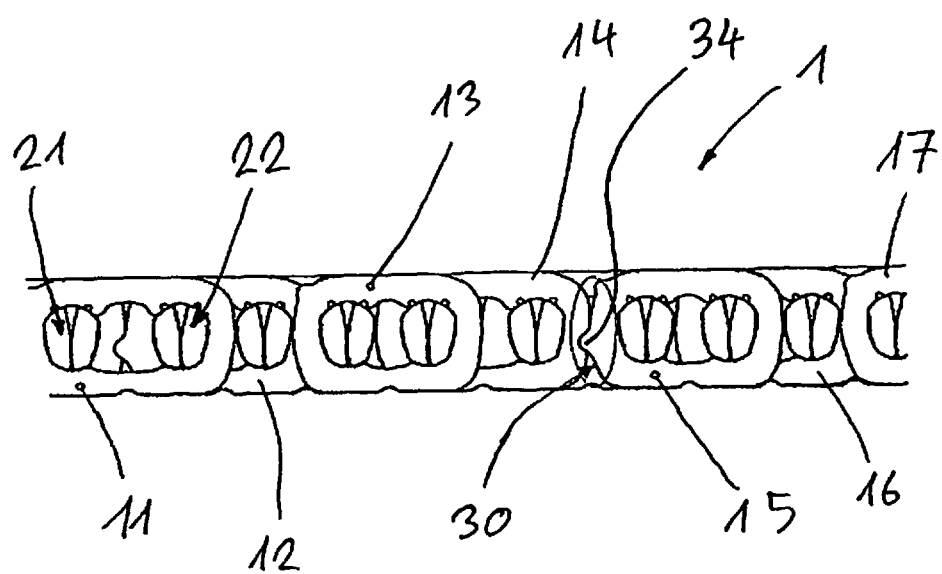

METHOD FOR PRODUCING A LINK-PLATE CHAIN

CROSS-REFERENCE TO RELATED APPLICATION

This application is the U.S. national phase application under 35 U.S.C. §371 of International Application Serial No. PCT/EP2013/053863, having an international filing date of 27 Feb. 2013, and designating the United States, the entire contents of which are hereby incorporated by reference to the same extent as if fully rewritten.

BACKGROUND OF THE INVENTION

1. Field of the Invention

The present invention relates to a method for producing a link-plate chain which is stretched under rotational speed while in a closed state. The present invention also relates to a link-plate chain in particular for a continuously variable, belt-driven, conical-pulley transmission having a plurality of link plates and rocker pressure pieces. In addition, the invention relates to a system for stretching a closed link-plate chain.

2. Description of the Related Art

From the German published first application DE 100 52 473 A1 a link-plate chain is known which is stretched in the closed state. The link-plate chain is turned at a low speed. The transmission ratio can be changed during the stretching process. The link plates of the link-plate chain can be stretched to different degrees of stretching in a stretching process prior to assembly. In addition, a force application angle of the stretching force can be varied.

An object of the present invention is to further increase the strength of link-plate chains.

SUMMARY OF THE INVENTION

The object is achieved by a method for producing a link-plate chain which is stretched under rotational speed in a closed state by the link-plate chain being stretched in opposite directions. The stretching process increases the strength of the link-plate chain. During the stretching a material plasticization occurs, which results in a permanent deformation of individual parts of the link-plate chain. The stretching parameters used in stretching, such as speed of rotation, torque, transmission ratio, geometry, and duration of the stretching process, can be varied depending on the type and construction of the link-plate chain.

In conventional stretching processes, the direction of rotation is not changed during stretching. That is, during a stretching process the speed of rotation may have been varied, but not the direction of rotation; that is, the link-plate chain was turned in only one direction of rotation when stretching. In conjunction with the present invention it has been found, completely surprisingly, that the strength of the link-plate chain can be increased significantly if the link-plate chain is stretched in opposite directions. Therefore, the link-plate chain is first stretched under speed of rotation in the one direction of rotation, and is then stretched under speed of rotation in the opposite direction of rotation. Through the method according to the invention it is possible for the strength of conventional link-plate chains to be increased substantially in an especially simple way. This makes it possible to use smaller link-plate chains, in particular narrower link-plate chains, especially advantageously, in fact without losses in terms of strength and the transmission of torque during operation of the link-plate chain, therefore advantageously saving construction space.

One preferred exemplary embodiment of the method is characterized in that after a stretching process in one direction of rotation the link-plate chain is re-stretched at least once under speed of rotation in the opposite direction of rotation. Thus, after a conventional standard stretching process, the link-plate chain is once again subjected to a stretching process under speed in the opposite direction of rotation. Amazingly, with the additional stretching process in the opposite direction of rotation, significantly better results have been obtained than with an additional stretching process in the original direction of rotation.

Another preferred exemplary embodiment of the method is characterized in that the link-plate chain is stretched repeatedly in opposite directions of rotation. During this process, the stretching parameters designated above may be kept constant or varied.

Another preferred exemplary embodiment of the method is characterized in that after a stretching process in one direction of rotation the link-plate chain is re-stretched exactly once under speed of rotation in the opposite direction of rotation. The result is achieved, especially advantageously, that with the stretching and re-stretching, plasticization regions introduced into the link-plate chain are distributed uniformly. The uniform distribution of the plasticization regions in the link-plate chain has proven to be especially effective with regard to increasing the strength of the link-plate chain.

In a link-plate chain, in particular for a continuously variable, belt-driven, conical-pulley transmission having a plurality of link plates and rocker pressure pieces, wherein the link-plate chain in particular has been produced according to a previously described method, the object stated above is achieved alternatively or additionally in that the link plates and/or rocker pressure pieces of the link-plate chain have plasticization regions which are arranged uniformly or distributed evenly within the link plates and/or rocker pressure pieces. This has proven to be especially advantageous with regard to the strength of the link-plate chain.

One preferred exemplary embodiment of the link-plate chain is characterized in that the plasticization regions are distributed symmetrically within the link plates and/or rocker pressure pieces of the link-plate chain. The plasticization regions of the link plates and/or rocker pressure pieces are preferably distributed symmetrically in relation to the center of the particular link plate. The center of the link plate designates a center axis of the link plate, the link plates not having to be designed symmetrically in relation to the center axis. The symmetrical distribution of the plasticization regions has proven to be especially advantageous with regard to the strength of the link-plate chain.

Another preferred exemplary embodiment of the link-plate chain is characterized in that the link-plate chain has significantly greater strength than a link-plate chain which has been stretched in only one direction of rotation. In conjunction with the present invention, it has been found, totally surprisingly, that an increase in strength of the link-plate chain by a factor of five to eight can be achieved through the previously described reversal of rotation direction when stretching.

Another preferred exemplary embodiment of the link-plate chain is characterized in that the link-plate chain has at least one link plate having a projection which extends in a longitudinal direction of the link-plate chain. The projection is preferably provided at an end of the link plate, and serves to define the direction of rotation of the link-plate chain in the installed state.

In addition, the invention relates to the use of a system for stretching a closed link-plate chain, in particular a previously described link-plate chain, wherein the link-plate chain is stretched in opposite directions of rotation, in particular according to a previously described method. The stretching in opposite directions of rotation can be carried out especially advantageously on a conventional system for stretching a closed link-plate chain.

Moreover, the invention relates to a system for stretching a closed link-plate chain, in particular a previously described link-plate chain, wherein the system is operable in opposite directions of rotation when stretching the link-plate chain under speed. The system may be designed in the same way as or similar to a system for stretching which is disclosed in FIG. 5 of the German published first application DE 100 52 473 A1 and the associated description of figures. It is essential here, however, that the system for stretching can be operated not only in one direction of rotation, but in opposite directions of rotation.

Additional advantages, features and details of the invention can be seen from the following description, in which various exemplary embodiments are described in detail with reference to the drawing.

BRIEF DESCRIPTION OF THE DRAWING

FIG. 1 shows a side view of a portion of a link-plate chain which can be stretched in opposite directions of rotation, according to the method of the present invention.

DESCRIPTION OF THE PREFERRED EMBODIMENTS

FIG. 1 shows a fragmentary side view of a link-plate chain 1 having link plates 11, 12, 13, 14, 15, 16, 17, as well as additional link plates which are not indicated or are concealed. Link plates 11 through 17 of the link-plate chain 1 are arranged in a plurality of rows situated side-by-side, running in the longitudinal direction of link-plate chain 1.

Link plates 11 through 17 of link-plate chain 1, viewed in the transverse direction, can be situated in different arrangement patterns, which repeat themselves in the longitudinal direction of link-plate chain 1, and are arranged offset to each other in the longitudinal direction. Possible arrangements of link plates 11 through 17 of link-plate chain 1 are disclosed, for example, in the German published first applications DE 103 29 708 A1 and DE 10 2004 012 400 A1.

In the German published first application DE 100 52 473 A1, it is disclosed that a link-plate chain as shown in the present FIG. 1 can be stretched to increase its strength. When this is carried out, link plates 11 through 17 of link-plate chain 1 are stretched in the assembled state of the closed link-plate chain 1. To perform the stretching, the closed link-plate chain 1 is positioned, for example, between two conical pulleys of a stretching system.

A system for stretching link-plate chain 1 is disclosed, for example, in FIG. 5 of the German published first application DE 100 52 473 A1 and the associated description of the drawing figures. Link plates 11 through 17 of link-plate chain 1 shown in present FIG. 1 are connected to each other in a known manner by pairs of rocker pressure pieces 21, 22. The pairs of rocker pressure pieces 21, 22 extend transversely, relative to the longitudinal direction of the chain, through openings formed in link plates 11 through 17. And as is shown in FIG. 1, each surface of the rocker pressure pieces that extends transversely relative to the longitudinal direction of the chain is convexly curved. Consequently, the contacting surfaces of the rocker pressure pieces of each rocker pressure piece pair 21 and 22 are convexly curved. A projection 34 is formed at one end 30 of the link plate 15. The projection 34 serves to define a first direction of rotation or running direction of the link-plate chain 1.

When the link-plate chain 1 is moved in the direction of the projection 34, that is, toward the left in FIG. 1, that movement corresponds to a first direction of rotation when stretching the link-plate chain. When the link-plate chain 1 is moved in the opposite direction, that is, toward the right in FIG. 1, that movement corresponds to a second direction of rotation, which is the direction that is opposite to the first direction of rotation.

In conventional stretching processes, the link-plate chain 1 is rotated or moved in only one direction of rotation when stretching. In conjunction with the present invention, it has been found that the strength of the link-plate chain 1 can be increased substantially if, after one stretching process in the first direction of rotation, link-plate chain 1 is subjected to an additional stretching process in the opposite direction of rotation.

The resulting strength increase is attributed to the fact that plasticization regions produced in the link plates and/or the rocker pressure pieces of the link-plate chain 1 are distributed more evenly or uniformly by the reversal of direction of rotation while stretching. Through the repetition of a stretching process in the opposite direction of rotation, with the stretching parameters applied to the link-plate chain otherwise the same, it is possible to achieve particularly advantageously a symmetric distribution of the plasticization regions in the link plates and/or the rocker pressure pieces of the link-plate chain. The symmetric distribution of the plasticization regions refers in each case to the centers of the individual link plates 11 through 17 considered in the longitudinal direction of the link-plate chain.

Stretching in the opposite directions of rotation or directions of motion of the link-plate chain is also referred to as double-stretching. Through double-stretching, the resulting plasticization regions within the link-plate chain become symmetrical and uniform in the longitudinal direction of the link-plate chain. The plasticization within the chain structure results in deformations in the link plates and/or in the rocker pressure pieces that provide strength advantages in the operation of link-plate chain 1 when it is installed in an operating continuously variable, belt-driven, conical-pulley transmission. Trials carried out in conjunction with the herein-disclosed method in accordance with the present invention have shown that the strength of link-plate chain 1 can be increased by a factor of five to eight by double-stretching in opposite directions of rotation.

The additional stretching or re-stretching of link-plate chain 1 in the opposite running direction or direction of rotation results in different or additional permanent deformations on the individual parts of link-plate chain 1. The additional permanent deformations appear both on the link plates 11 through 17 and on the rocker pressure pieces 21, 22. According to an additional aspect of the invention, not only the strength of the link-plate chain 1 is improved by the double-stretching, but also the acoustics of the link-plate chain 1 during operation.

What is claimed is:

1. A method for producing a strengthened link-plate chain, said method comprising the steps of:
   installing a closed link-plate chain about a pair of conical pulleys having parallel axes of rotation that are spaced from each other in a longitudinal direction of the chain, the chain having a plurality of link plates interconnected by rocker pressure pieces, wherein the link plates each have a single link plate opening within which opening two pairs of rocker pressure pieces having the same cross-sectional form are received, each pair of rocker pressure pieces spaced from the other pair in the chain longitudinal direction and each surface of the rocker pressure pieces that extends transversely relative to the longitudinal direction of the chain is convexly curved so that the contacting surfaces of the rocker pressure pieces of each rocker pressure piece pair are convexly curved, and wherein the chain passes around each of the conical pulleys and travels in a direct linear path from one conical pulley to the other conical pulley of the pair of spaced conical pulleys;

applying in a longitudinal direction of the chain as the chain is in a continuous longitudinally straightened condition extending between the conical pulleys a first stretching force to the chain by moving the axes of rotation of the conical pulleys away from each other in a longitudinal direction of the chain while one of the conical pulleys is driven to rotate in a first direction of rotation to provide in the chain first regions of permanent deformation by plasticization of chain material in the first regions of permanent deformation;

applying in a longitudinal direction of the chain as the chain is in a continuous longitudinally straightened condition extending between the conical pulleys a second stretching force to the chain by moving the axes of rotation of the conical pulleys away from each other in a longitudinal direction of the chain while one of the conical pulleys is driven to rotate in a second direction of rotation that is opposite to the first direction of rotation to provide in the chain second regions of permanent deformation by plasticization of chain material in the second regions of permanent deformation;

whereby longitudinally opposed inner, longitudinally spaced end faces of the link plate openings are subjected to the stretching forces to cause permanent plastic deformation of the longitudinally opposed inner end faces of the link openings;

wherein respective first and second regions of permanent deformation are spaced from each other in a longitudinal direction of the chain, are distributed symmetrically in relation to a link plate center axis, and serve to increase the strength of the chain as compared with a chain not having longitudinally spaced first and second regions of permanent deformation.

2. The method according to claim 1, wherein after a first stretching process in each direction of rotation of the conical pulleys, the link-plate chain is re-stretched once under rotational speed of the conical pulleys in opposite directions of rotation of the conical pulleys.

3. The method according to claim 1, wherein the link-plate chain is stretched multiple times in opposite directions of rotation of the conical pulleys.

4. The method according to claim 1, wherein after a stretching process in the first direction of rotation of the conical pulleys the link-plate chain is re-stretched exactly once in the second direction of rotation and under the same stretching parameters as are applied in the first direction of rotation.

5. A link-plate chain having a plurality of link plates and rocker pressure pieces; the link-plate chain having been produced according to the method of claim 1, wherein respective ones of at least the link plates and the rocker pressure pieces of the link-plate chain have plasticization regions which are distributed evenly within respective ones of at least one of the link plates and the rocker pressure pieces of the link-plate chain, and are distributed symmetrically in relation to a link plate center axis.

6. The link-plate chain according to claim 5, wherein the link-plate chain has greater strength than a link-plate chain which has been stretched in only one direction of rotation of the conical pulleys.

7. The link-plate chain according to claim 5, wherein the link-plate chain has at least one link plate having a projection which extends in a longitudinal direction of the link-plate chain.

* * * * *